United States Patent
Blanc

(10) Patent No.: US 6,957,940 B2
(45) Date of Patent: Oct. 25, 2005

(54) UNIT FOR SORTING AND PACKAGING PRODUCTS CAPABLE OF BEING HUNG ON A HOOKING MEMBER FOR THE PURPOSE OF THEIR CONVEYANCE, SUCH AS BUNCHES OF FRUITS, IN PARTICULAR TABLE GRAPES OR TRUSS TOMATOES

(75) Inventor: Philippe Blanc, Montauban (FR)

(73) Assignee: Materiel pour l'Arboriculture Fruitiere, Montauban (FR)

( * ) Notice: Subject to any disclaimer, the term of this patent is extended or adjusted under 35 U.S.C. 154(b) by 32 days.

(21) Appl. No.: 10/799,688

(22) Filed: Mar. 15, 2004

(65) Prior Publication Data

US 2004/0193312 A1    Sep. 30, 2004

(30) Foreign Application Priority Data

Mar. 25, 2003 (FR) .................................. 03 03628

(51) Int. Cl.⁷ .............................................. B65G 1/00
(52) U.S. Cl. ........................ 414/222.01; 198/341.06; 198/339.1; 198/680
(58) Field of Search ................................ 198/680, 681, 198/682, 683, 341.01, 341.03, 341.06; 441/222.02, 441/222.11, 222.13, 225.01

(56) References Cited

U.S. PATENT DOCUMENTS

| 2,973,721 | A |   | 3/1961 | Wagter |
| 3,659,709 | A |   | 5/1972 | Bartlett, Jr. et al. |
| 3,795,200 | A |   | 3/1974 | Pipers et al. |
| 3,796,327 | A | * | 3/1974 | Meyer et al. .......... 414/222.02 |
| 4,178,659 | A | * | 12/1979 | Simonds ..................... 452/182 |
| 4,180,152 | A | * | 12/1979 | Sefcik ................... 198/377.06 |
| 4,689,855 | A | * | 9/1987 | Dameron ................... 452/177 |

FOREIGN PATENT DOCUMENTS

| EP | 0 449 386 | 10/1991 |
| FR | 2 651 759 | 3/1991 |
| GB | 2 124 989 | 2/1984 |

* cited by examiner

Primary Examiner—Richard Ridley
(74) Attorney, Agent, or Firm—Young & Thompson

(57) ABSTRACT

A unit for sorting and packaging products has a conveying line with an endless chain beneath which there are articulated about a vertical axis a plurality of coupling arms equipped with a coupling member for pulling plates equipped with a member for hooking on a product and deployed along a conveying track parallel to and below the conveying line. Along this conveying line there are distributed a plurality of work stations, each having a relief track to which the pulled plates are selectively directed by routing elements, and along which each of the plates is successively uncoupled by automatic pivoting of the coupling arms, is brought into a position of readiness for loading or unloading, and then is recoupled automatically to a coupling arm, and hence reintegrated along the conveying line.

14 Claims, 6 Drawing Sheets

Figure 1:
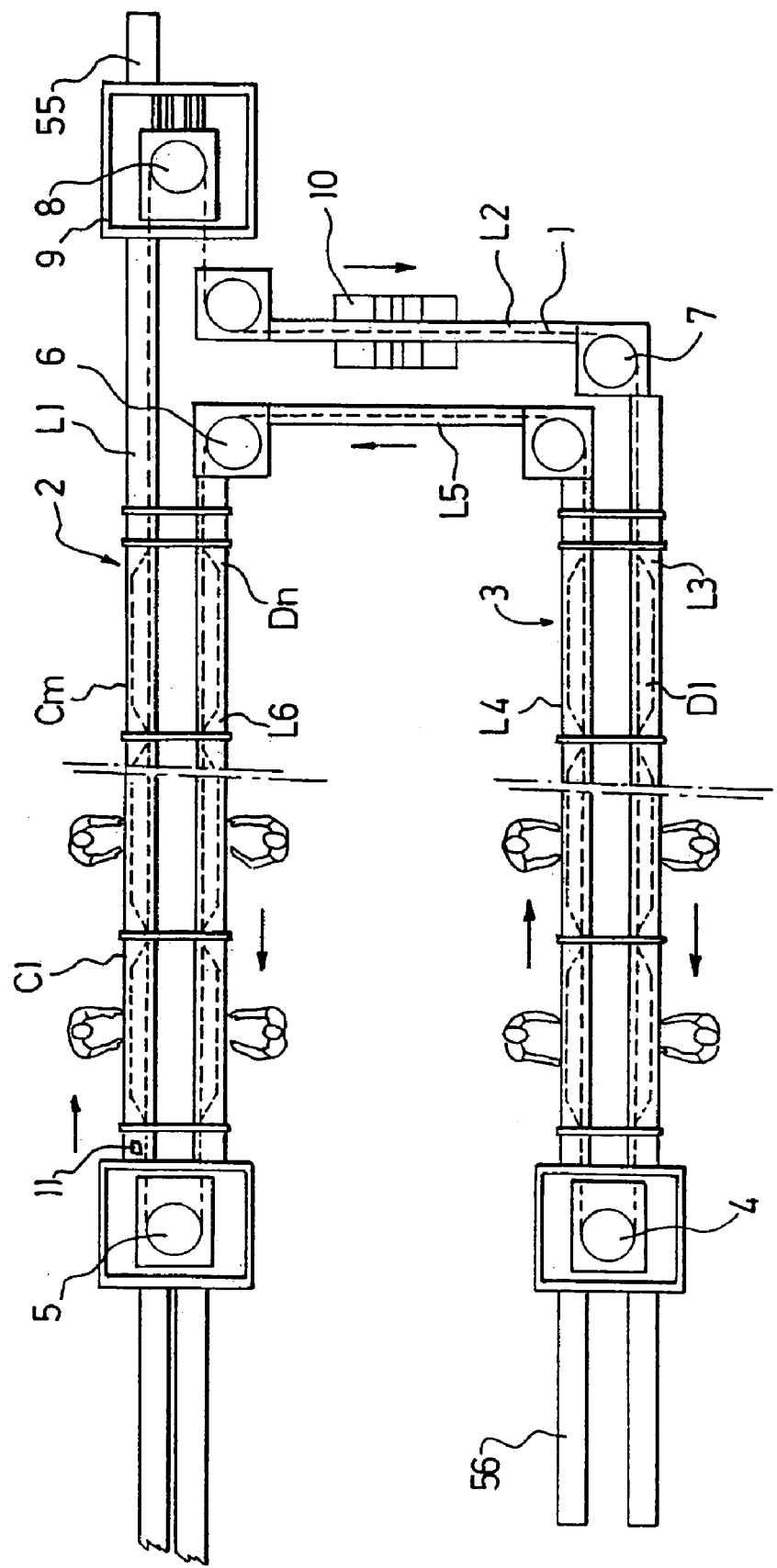

UNIT FOR SORTING AND PACKAGING PRODUCTS CAPABLE OF BEING HUNG ON A HOOKING MEMBER FOR THE PURPOSE OF THEIR CONVEYANCE, SUCH AS BUNCHES OF FRUITS, IN PARTICULAR TABLE GRAPES OR TRUSS TOMATOES

The invention relates to a unit for sorting and packaging products capable of being hung on a hooking member for the purpose of their conveyance, such as bunches of fruits, in particular table grapes or truss tomatoes.

At present, the sorting and the packaging of table grapes are carried out in a very unsophisticated manner by workers trained to be able to sort the bunches according to predetermined selection criteria mainly relating to the weight and appearance of the bunches.

In the most common cases, the sorting and packaging installations simply consist of support shelves for the various packages and weighing machines for checking the final weight of these packages. The most mechanised installations at present have, in addition, conveying devices for supplying crates containing the fruits coming from the orchard and for discharging the filled packages, the intention being to enable integration of several work stations and palletising zones.

It will be appreciated then that these operations for sorting table grapes involve high labour costs and lead to quite large disparities between the various packages supposed to contain fruits of the same classification, owing to the sorting method which is dependent on human assessment of the appearance and weight of the said fruits.

Furthermore, when a minimum net weight of fruits in each package is required, as is increasingly the case, according to this method, this minimum net weight cannot be rigorously obtained, and in practice each package has an excess net filling weight in order to guarantee the required minimum.

Now, this excess weight can prove to be a not inconsiderable percentage of the net weight actually invoiced, and therefore constitutes an appreciable loss of earnings.

As regards the mechanisation of the sorting operations, it should be noted that certain installations, in particular those described in the patents U.S. Pat. No. 3,659,709 and EP 449 386, have been designed for a sector closely related to that of fruit arboricultrure, namely that of floriculture, for the purpose of sorting and packaging flowers according to the length of the stem of the said flowers.

However, such installations prove to be of relatively high complexity owing in particular to the fact that they require the use of three synchronous conveyors, for loading the flowers, unloading the flowers and transfer between the loading and unloading zones.

Furthermore, in this design the products are successively transported on three different types of supports (loading, transfer, unloading) and are therefore subjected to handling at each transfer which, although unlikely to damage flowers (at least as reported in these prior documents), could prove to be damaging when transferring fruits.

The present invention aims to make up for the current absence of mechanisation of the processes for sorting and packaging products such as fruits in bunches, and has as its main object the provision of an automated sorting and packaging unit which is of very simple design, is capable of producing an exhaustive classification of the products and requires, in terms of labour, simply an operation for hooking the products onto the hooking members and unhooking the sorted products for the purpose of their packaging.

Another object of the invention is to provide an automated unit capable of making it possible to come as close as possible up to the minimum net weights of fruits required in the package.

To this end, the invention is aimed at a unit for sorting and packaging products such as bunches of fruits, comprising in combination:

a conveying line with an endless chain moving in a substantially horizontal plane and beneath which there are distributed a plurality of coupling arms articulated with respect to the said chain about a vertical axis, so as to be able to pivot between two positions, called the pulling and grasping positions, each of the said coupling arms being associated with resilient means capable of urging its pivoting towards its grasping position, and having a free end equipped with a coupling member, conveying track which forms a circuit parallel to that of the conveying line, extends in a horizontal plane situated beneath that of the said conveying line vertically in line with the coupling members of the coupling arms in the pulling position of the latter, and on which there are arranged a plurality of plates, each equipped, on the one hand, with a coupling member capable of being coupled to the coupling member of a coupling arm for the purpose of pulling each of the said plates by one of the said coupling arms, and, on the other hand, with a hooking member for hanging a product beneath the said plate, a plurality of work stations Cm, Dn, distributed laterally along the conveying line and each having:
  a track, called the relief track, equipped with two end sections for joining to the conveying track and with a central section extending parallel to the conveying line, vertically in line with the coupling members of the coupling arms in the grasping position of the latter,
  routing means arranged at the junction between the access section of the relief track and the conveying track,
  uncoupling means capable of releasing the coupling members of the coupling arms and of the plates,
  means for driving the uncoupled plates capable of displacing them along the central section of the relief track as far as a position of readiness, called the "front of the queue" position,
  coupling means capable of enabling, when instructed, a coupling of the plate situated at the front of the queue to a coupling arm of the conveying line, in the grasping position of this arm, an optical and/or ponderal analysing station arranged along the conveying track for the purpose of providing information enabling the sorting of the products according to predetermined selection criteria, a detecting station arranged along the conveying track and adapted to detect the passage of the empty plates pulled along the said conveying track by a coupling arm, the said analysing station and detecting station being arranged so as to delimit two distinct zones along the path of the conveying line, consisting, as viewed in the direction of movement of the endless chain, of:
  a product-unloading zone, which has, as the upstream starting limit, the analysing station and along which n work stations Dn are distributed,
  and a product-loading zone, which has, as the upstream starting limit, the detecting station and along which m work stations Cm are distributed, and programmed managing means capable, in the loading zone, of controlling the routing means of the work stations Cm so as to distribute to the said work stations the empty plates detected by the detecting station, and, in the unloading zone, of controlling the routing means of the work stations Dn so as to supply each of the said work stations with products of a given classification.

According to the invention, the sorting and packaging unit therefore has a single synchronous conveying line capable of making it possible to know at each step the position of coupling arms which can therefore enable the transported products to be selectively distributed to the various unloading stations according to the optical and/or ponderal sorting information provided by the analysing station.

Furthermore, along this conveying line there are distributed work stations which operate in a completely asynchronous manner with respect to the said conveying line and therefore allow working speeds compatible with handling operations which require human intervention, to which work stations the plates are diverted for the purpose of their unloading or their loading, before being automatically reintegrated in a synchronised manner into the conveying line.

The sorting and packaging unit according to the invention therefore constitutes an installation of very simple design since it requires only a single synchronous conveying line, which, with the presence of unskilled workers performing simple hooking-on, unhooking and packaging operations, makes it possible to carry out, with increased speed, an automatic sorting of the said products ensuring an exhaustive classification simply according to the set selection criteria.

According to an advantageous embodiment, the coupling members of the coupling arms and of the plates comprise front coupling faces capable of enabling coupling by frontal abutment of the said coupling faces, which leads to pulling of the plates by the coupling arms, and uncoupling by pivoting the said coupling arms towards their pulling position.

Such a coupling method leads to an uncoupling which consists simply in pivoting the coupling arms over a small angular sector, counter to the force exerted by the associated springs, and a coupling which consists in allowing the pivoting of a coupling arm towards its grasping position at the level of the plate situated at the front of the queue in a relief track, so that the coupling member of the said coupling arm becomes coupled to that of the said plate, bringing about the reintroduction, by being pulled by the latter, along the conveying line.

Furthermore, according to this design, and advantageously, the coupling members of the coupling arms consist of a finger extending vertically beneath the said coupling arms, the coupling members of the plates consisting of a receptacle made in the said plates and equipped with a longitudinal opening for lateral introduction and escape of the fingers of the coupling arms upon the pivoting of the latter.

Moreover, according to another advantageous embodiment:

the uncoupling means comprise, for each work station Cm, Dn, means for supporting and guiding the coupling members of the coupling arms, capable of bringing about a pivoting of the said coupling arms towards an intermediate position between their grasping position and their pulling position, counter to the force exerted by the associated resilient means, then of allowing a reverse pivoting of the coupling arms so that the latter extend in their grasping position vertically in line with the front of the queue position of the plates on the relief track, the coupling means comprise a retractable supporting member capable of selectively deviating the coupling arms from their grasping position, vertically in line with the front of the queue position of the plates on the relief track.

These uncoupling means consists, in addition, advantageously, of a fixed ramp for supporting and guiding the coupling members of the coupling arms, which is arranged above the central section of the relief track and has an oblique initial unhitching section secant with respect to the axis of the central section of the relief track, a central section parallel to the said axis, and an oblique final hitching section secant with respect to the axis of the central section of the relief track.

Furthermore, advantageously, the retractable supporting member consists of a cam articulated about a vertical axis and equipped with a longitudinal border for supporting and guiding the coupling members of the coupling arms, the coupling means comprising, in addition, actuating means capable of pivoting the said cam between an active position for supporting and guiding the coupling members of the coupling arms, and a passive position retracted with respect to the said coupling members in their grasping position.

Such coupling means can, in addition, be manually controlled, and to this end, advantageously, each work station Cm, Dn has a manually-actuated member for activating the actuating means, which is capable of bringing about the pivoting of the cam towards its passive position.

Such a cam has, in addition, advantageously, a stop peg extending vertically beneath the said cam and adapted to lodge in a longitudinal groove made in the plates, in the active position of the said cam, and to escape from the said longitudinal groove, through a lateral opening made in this longitudinal groove, upon the pivoting of this cam from its active position towards its passive position.

Such a stop peg makes it possible to provide in a very simple manner a retractable marker for exact determination of the front of the queue position of the plates.

Moreover, advantageously, the means for driving the plates along the central section of the relief tracks comprise an endless chain moving in a vertical plane, having a horizontal strand integrated in the relief track, for bearing the plates.

In addition, for the purpose of defining a perfectly rectilinear path of the plates along the tracks of this unit, and advantageously, the conveying track and each relief track comprise a longitudinal slot made in the said tracks, each plate having a vertical rod secured beneath the said plate so as to extend through the slot of the tracks, and carrying a member for hooking on a product.

According to another advantageous feature of the invention, the detecting station comprises two detecting cells which are vertically offset and arranged so as to discriminate respectively, upon the passage of a coupling arm, between the presence of an empty plate coupled to the said coupling arm, and the presence of a plate loaded with a product attached to this coupling arm.

Moreover, each work station comprises advantageously:
a cell, called the exit cell, for detecting the presence of a plate in the front of the queue position on the relief track, the managing means being programmed to inhibit the operation of the coupling means in the absence of the activation of the said detecting cell, a cell, called the entry cell, for detecting the passage of an uncoupled plate on the central section of the relief track, the managing means being programmed to inhibit the routing means, so as to prevent access to the said relief track, and to stop the movement of the conveying chain, in the absence of sequences of activation/deactivation of the said detecting cell.

Moreover, advantageously, and for the purpose of coming as close as possible up to the minimum net weight of products required in each package:

each unloading station Dn has two supports capable of each receiving a package to be filled, each of the said supports having a distinctive sign capable of enabling its identification with an indicator light dedicated to the said support, the managing means are programmed, for each unloading station Dn, to bring about selective lighting of the indicator lights in order, using the unit-weight information of each product, to:

control the filling of a first package until a reference net filling weight less than the total net weight of the package is obtained, once the reference weight is obtained, select, from among the products ready at the unloading station Dn, a combination of products, the total weight of which makes it possible to come as close as possible up to the total net weight, control the depositing of the products arriving at the front of the queue and not previously selected into the second, initially empty package, and the depositing of the previously selected products into the first package, signal, once the selected products have been unhooked, the end of the filling of the first package so as to enable its discharge and replacement, and control the continuation of the filling of the first package.

Such management makes it possible to come as close as possible up to the minimum net weight required, by simply, for each operator, following the indications relating to the destination of each unhooked product which are provided by the lighting of the corresponding indicator.

Figure 2:
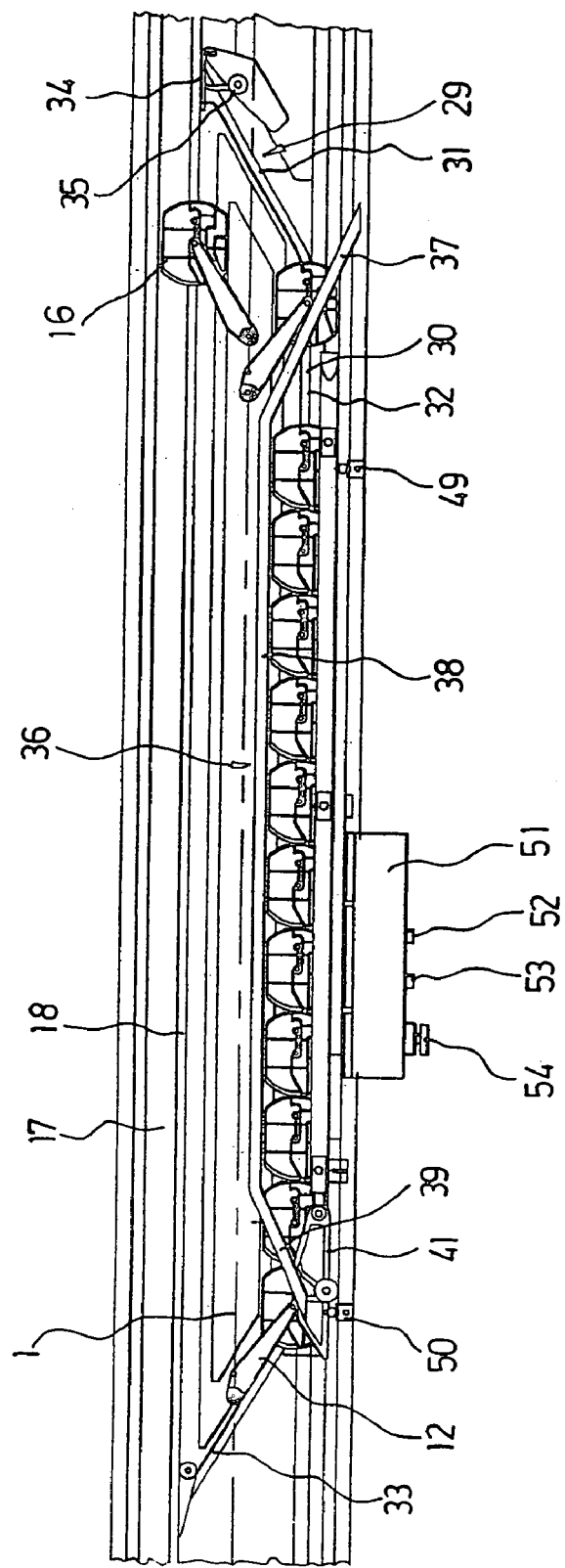
Figure 3:
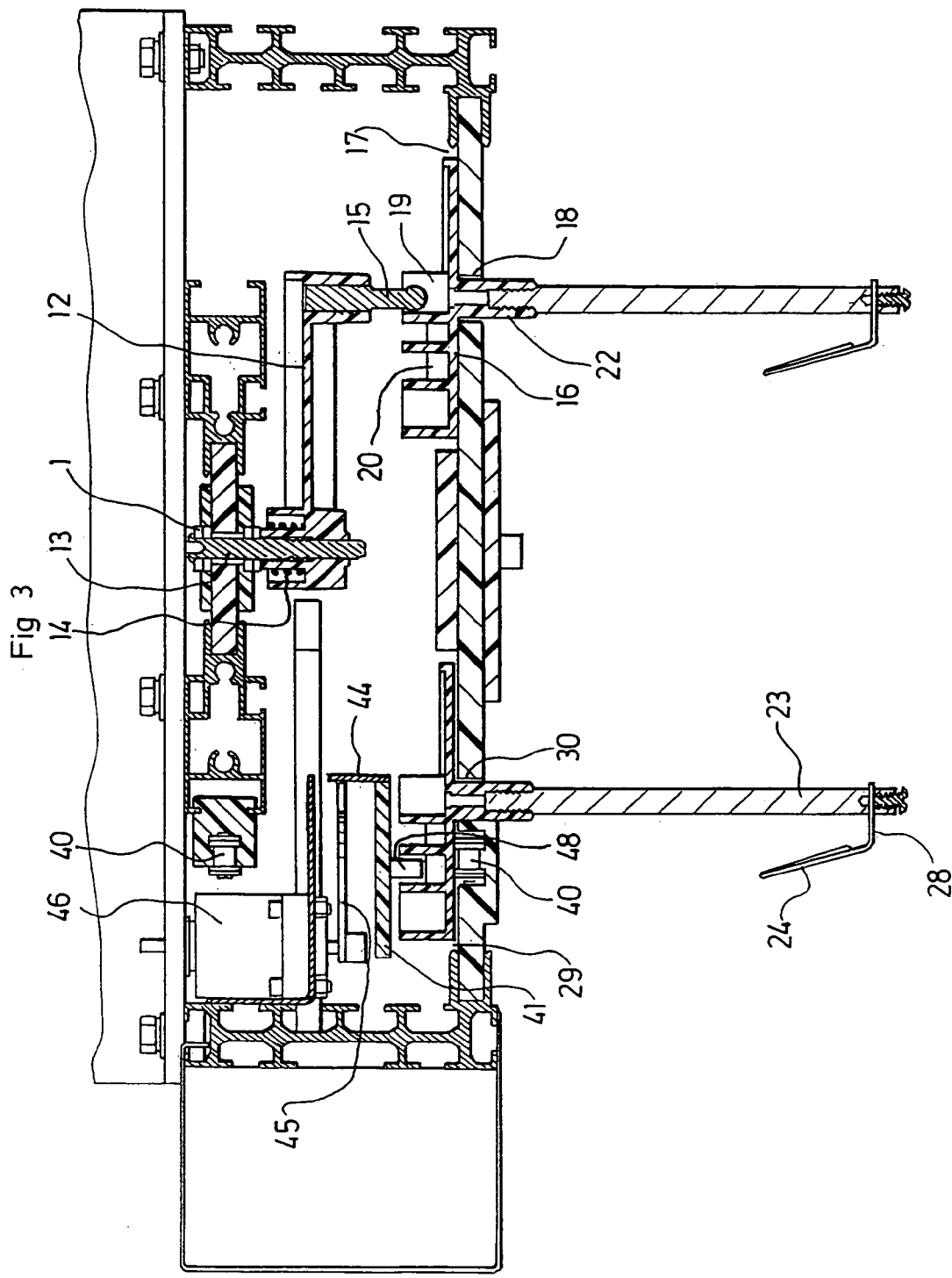
Figure 4:
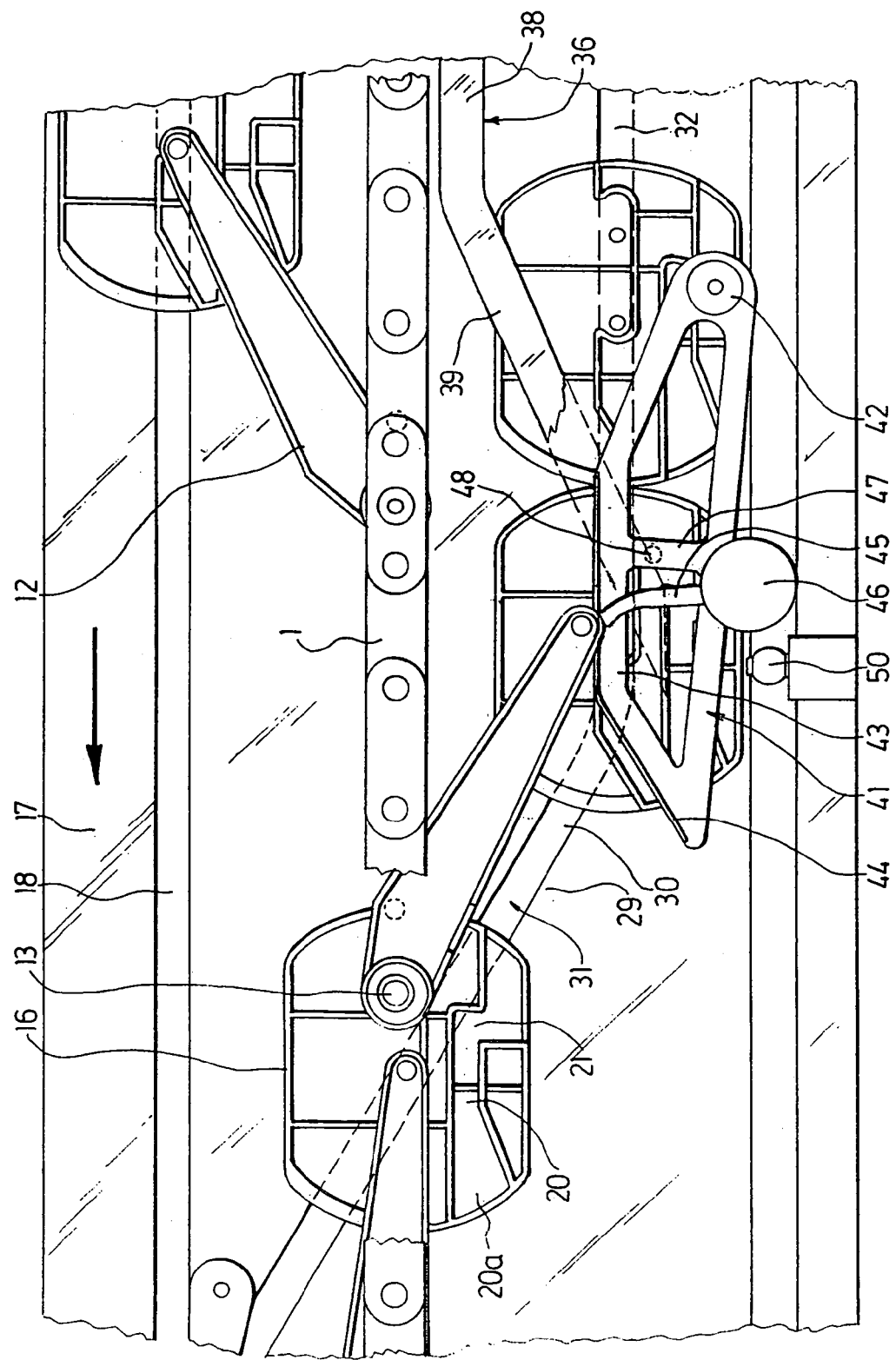
Figure 5:
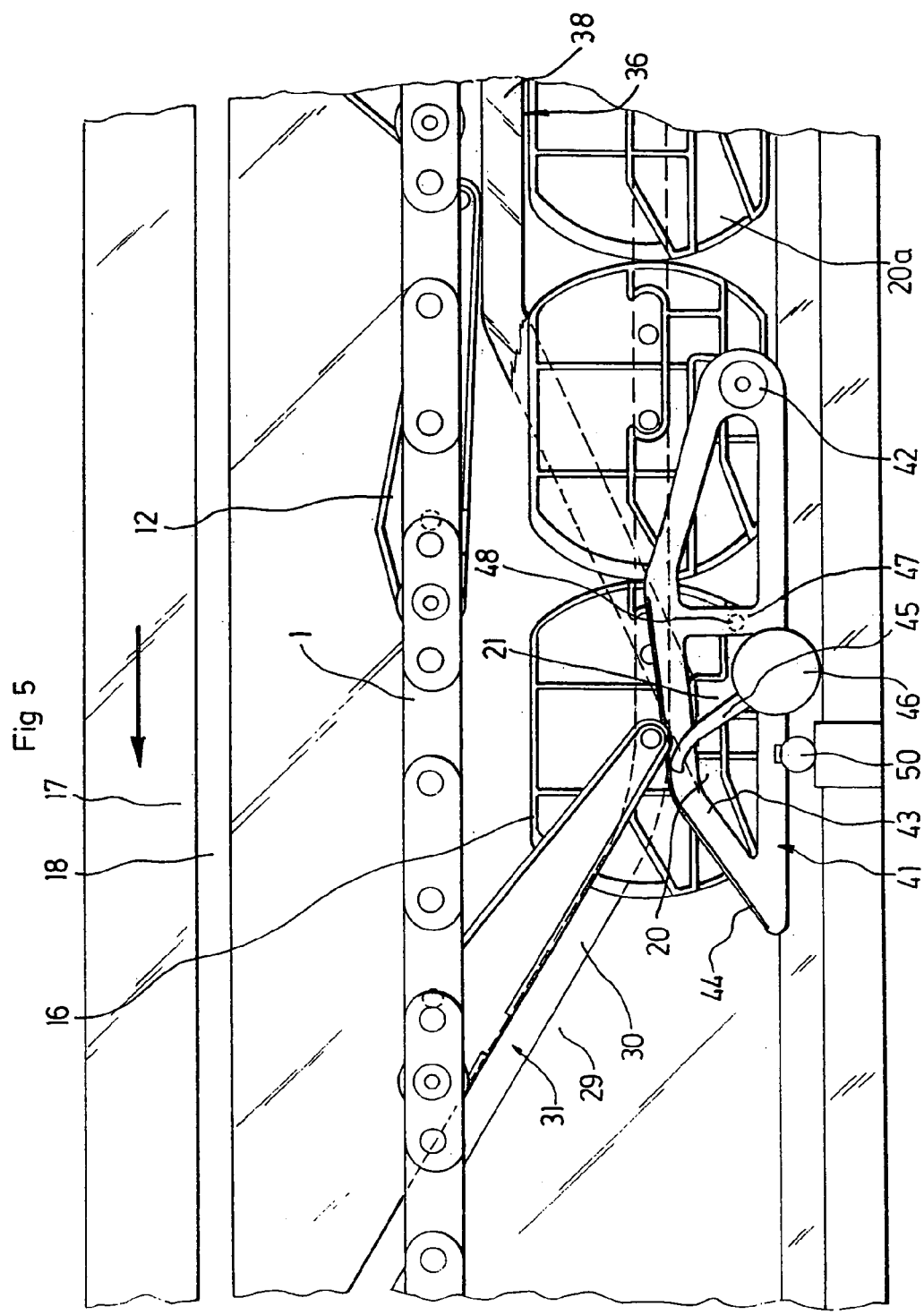
Figure 6:
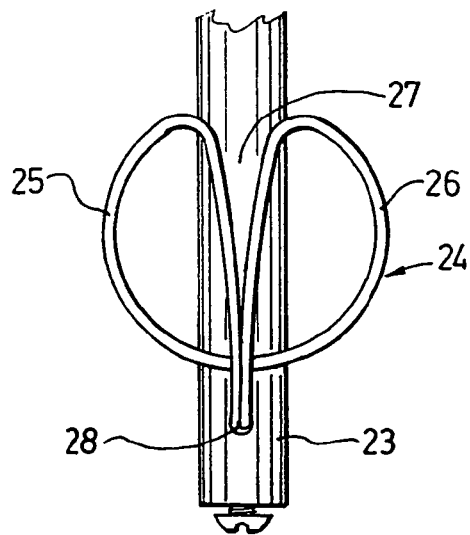
Figure 7:
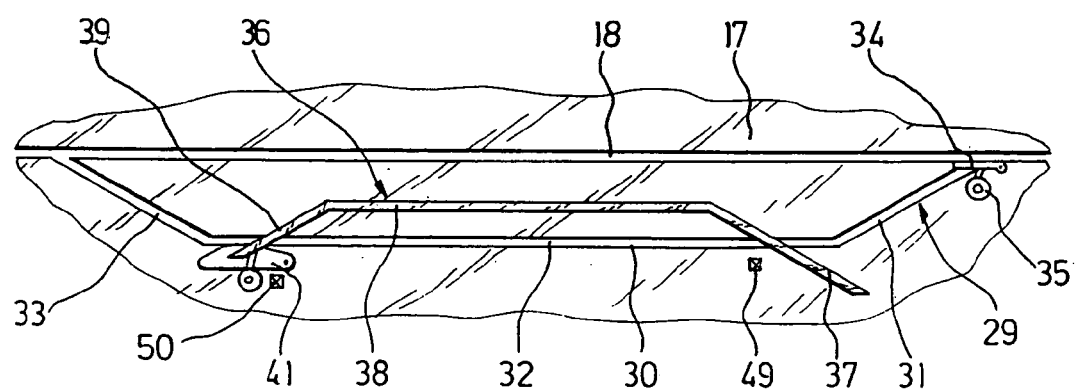

Other features, objects and advantages of the invention will emerge from the detailed description which follows with reference to the appended drawings which show by way of non-limiting example a preferred embodiment thereof. In these drawings:

FIG. 1 is a schematic plan view of a sorting and packaging unit according to the invention, FIG. 2 is a plan view of a loading (or unloading) module of a sorting and packaging unit according to the invention, FIG. 3 is a cross-section in a vertical plane, on an enlarged scale, of the conveying path of this sorting and packaging unit, FIGS. 4 and 5 are partial plan views, on an enlarged scale, showing the two states of the means for guiding the coupling arms, preventing the hitching of a plate in readiness (FIG. 4) and allowing this hitching (FIG. 5) respectively, FIG. 6 is a front view of a hooking member according to the invention, and FIG. 7 is a schematic top view of a loading (or unloading) module according to the invention.

The sorting and packaging unit according to the invention shown in FIG. 1 is adapted to enable the sorting, according to a predetermined classification and the packaging in packages of predetermined average total net weight, of the products in the form of bunches such as table grapes or truss tomatoes.

This sorting and packaging unit comprises a conveyor with an endless chain 1 moving in a horizontal plane on a path in the form of two Us 2, 3 nested one in the other, the continuity of which is ensured by means of two 180° angle deflecting mechanisms 4, 5 arranged at the ends of the legs of the Us 2, 3, and four 90° angle deflecting mechanisms such as 6, 7 arranged at each of the vertices of the said Us.

In addition, this conveyor has a station 9 for tensioning the chain 1, incorporating a 180° angle deflecting mechanism 8 interposed between the base of one of the legs of the outer U 2.

Thus, such a conveyor has six rectilinear conveying sections: 4 parallel longitudinal sections L1, L3, L4, L6 forming the four legs of the Us 2, 3, and two parallel transverse sections L2, L5 for joining the longitudinal sections L1–L3 and L4–L6, respectively, and forming the two bases of the Us 2, 3.

The sorting and packaging unit also comprises means for analysing the products, arranged at the transverse conveying section L2 and integrated in an analysing and managing station 10.

In customary fashion, this analysing and managing station 10 integrates optical analysing means having optical sensors such as cameras arranged on both sides of the conveying chain 1 so as to view four equatorial faces of the products.

Furthermore, this analysing and managing station 10 comprises, likewise in customary fashion, weighing sensors for determining the unit weight of each product.

The data delivered by these sensors are processed by a processing and managing unit adapted to:

calculate the size of the elements of a bunch and the size variation between the various elements of the same bunch (infrared scanning), determine the coloration of the elements of the bunch and the variations in coloration of the elements of the same bunch (red/green/blue light scanning), calculate the weight of each bunch, and establish, from a table of choices decided on by the operator of the installation, a classification of the product and hence an allocation to a specific packaging station.

The sorting and packaging unit comprises, in addition, detection electronics 11 arranged at the free end of the rectilinear section L1, that is to say at the beginning of this section L1 as viewed in the direction of movement of the conveyor. These detection electronics 11 have two superposed cells adapted, as described in detail further below, to enable the management of the operations for loading the products onto the conveying chain 1.

Arranged in this way, this analysing and managing station 10 and these detection electronics 11 delimit two successive zones along the conveying chain 1:

a first zone extending between the detection electronics 11 and the analysing and managing station 10 (as viewed in the direction of movement of the conveyor), which is dedicated to the loading of the products and the useful length of which corresponds to the rectilinear section L1, and a second zone extending between the analysing and managing station 10 and the detection electronics 11, which is dedicated to the packaging of the analysed products and the useful length of which corresponds to the rectilinear sections L3, L4, L6.

Furthermore, each of these zones is subdivided respectively into individual loading stations C1 . . . Cm, and individual unloading stations D1 . . . Dn, each allocated to an operator as explained further below.

In the example described, the sorting and packaging unit comprises a number of unloading stations Dn equal to three times the number of loading stations Cm. By way of example, the total number of stations may be equal to 64, i.e. 16 loading stations Cm and 48 unloading stations Dn.

The elements of this conveyor which are intended for transporting the products comprise, firstly, horizontal coupling arms 12 arranged beneath the conveying chain 1 and articulated with respect to the latter, at one of their ends, about a vertical pin 13 secured to the said chain. Each of these coupling arms 12 is, in addition, associated with a spring 14 adapted to urge it clockwise towards an angular stop position, called the grasping position (realised by a mechanical stop which is not shown), in which the said arm extends obliquely, at an angle of the order of 30°, with respect to the axis of the conveying line.

Each of these coupling arms 12 is moreover equipped, at its free end, with a finger 15 secured so as to extend vertically beneath the said coupling arm.

The transporting elements of the conveyor according to the invention comprise, in addition, plates 16 adapted to slide in a main track 17 forming a circuit parallel to that of the conveying chain 1, and extending in a horizontal plane situated below the horizontal plane in which the said conveying chain extends.

This main track 17 in which an axial longitudinal slot 18 is made, is, in addition, offset horizontally with respect to the conveying chain 1, so that the said axial slot extends vertically in line with the finger 15 of the coupling arms 12 in an angular position, called the pulling position, of these latter where they extend obliquely at an angle of the order of 30° with respect to the axis of the conveying line. This angular pulling position is obtained counter to the force exerted by the spring 14, and therefore corresponds to an orientation of the coupling arms 12 substantially symmetrical, with respect to the axis of the conveying line, to that corresponding to the grasping position.

Each plate 16 has, made in its upper face, a receptacle 19 in the shape of a C with parallel longitudinal limbs, that is to say having two rectilinear longitudinal sides with one side open, adapted to accommodate the finger 15 of a coupling arm 12 and thus bring about the pulling of the said plate by the said coupling arm.

Each plate 16 has, in addition, likewise made in its upper face, a longitudinal groove 20 having longitudinally the general shape of a U with a widened access section 20a and in which a lateral opening 21 is made close to the back of the said groove.

Each plate 16 also has a tapped sleeve 22 extending vertically beneath the said plate, adapted to extend through the axial slot 18 of the track 17 and accommodate the threaded upper end of a rod 23.

This rod 23 bears, finally, at its lower end, a hooking member 24 consisting of a metal cable wound, as shown in FIG. 6, so as to form two juxtaposed loops 25, 26, between which a V-shaped hooking indentation 27 is made, obtained by joining, after winding, the two end sections of the cable, which thus form, in addition, in the continuation of the indentation 27, a horizontal limb 28 for fixing the hooking member 24 to the lower end of the rod 23.

According to the principle of the above-described transporting elements, the products to be sorted and packaged are therefore transported along the conveying line while hooked onto the hooking members 24 of the plates 16 each pulled individually by a coupling arm 12 secured to a conveying chain 1, making it possible to know the positioning of the product along the conveying line at all times and thus deliver this product to an unloading station Dn dedicated to its classification.

For the purpose of loading and also unloading the products, each loading station Cm and each unloading station Dn is designed so as to enable completely asynchronous working with respect to the above-described conveyor.

To this end, each of these loading stations Cm and unloading stations Dn, which are moreover strictly identical and hence completely modular, has a relief path to which the plates 16 are routed when instructed, then along which these plates 16 are automatically uncoupled from the coupling arms 12 so as to remain in a position of readiness for their unloading (or their loading), and finally, at the end of which each loaded (or unloaded) plate 16 is automatically hitched by a coupling arm 12 and hence reintroduced synchronously into the conveying line.

First of all, the relief path of each station Cm, Dn consists of a track 29 similar to the main track 17 and hence pierced by an axial longitudinal slot 30 for guiding the sleeve 22 of the plates 16.

This track 29 has a central section 32 parallel to the main track 17 and symmetrical to the latter with respect to the axis of the conveying chain 1, so that the axial slot 30 of the said central section extends vertically in line with the finger 15 of the coupling arms 12 in their angular grasping position.

This central section 32 is, in addition, continued at each of its ends by two oblique, access and exit, sections 31, 33 for joining the relief path to the main track 17.

The access to this relief path is, moreover, controlled by means of a lever 34 articulated about a vertical axis and actuated by an electromagnet 35 adapted to position it:
 either in a position for blocking the relief path, in which this lever 34 extends longitudinally along the edge of the slot 18 of the main track and blocks the access to the access section 31 of the said relief path,
 or in a position for introduction of the plate 16 into the relief path, in which the lever 34 is obliquely moved away from the entrance to the access section 31, into which the plate 16 is then introduced owing to the force exerted by the spring 14 on the coupling arm 12 pulling this plate 16.

Each loading station Cm and unloading station Dn has, in addition, a ramp 36 for supporting the fingers 15 of the coupling arms 12, which is arranged above the relief track 29 and adapted to enable automatic uncoupling of the plates 16 at the start of the central section 32 of the relief path and to allow coupling of the plate 16 situated at the front of the queue at the end of the said central section.

To this end, this ramp 36 is composed of a tubular rail having:
 a first, unhitching section 37 which is oblique with respect to the axis of the conveying line and converges towards the latter, the said unhitching section being secant with respect to the axis of the central section 32 of the relief track 29, so as to cause the coupling arms 12 to pivot towards their angular pulling position, counter to the force of the spring 14, and thus cause the fingers 15 to escape laterally from the receptacle 19 of the plates 16,
 a second, central section 38 parallel to the main track 17 and to the rectilinear section 32 of the relief track 29, and extending in a vertical plane situated between the vertical planes passing through the axes of the slots 18, 30 of the said tracks, the said central section running along the major part of the central section 32 of the relief track 29 for longitudinal guidance of the fingers 15 of the coupling arms 12, and a third, hitching section 39 which is oblique and divergent with respect to the axis of the conveying line, the said hitching section being secant with respect to the axis of the central section 32 of the relief track 29, so as to allow and guide a pivoting of the coupling arms 12 towards their angular grasping position, under the effect of the force of the spring 14, and thus enable the introduction of the finger 15 of a coupling arm 12 into the receptacle 19 of the plate 16 situated at the front of the queue vertically in line with this hitching section 39, and consequently the coupling of this plate 16.

Each loading station Cm and unloading station Dn also has means for frictionally driving the plates 16 along the central section 32 of the relief track 29.

These frictional driving means consist of an endless chain 40 common to each rectilinear section L1, L3, L4, L6 of the conveyor, which moves in a vertical plane and the lower horizontal strand of which is accommodated in a longitudinal groove made in the relief track 29 so as to support the plates 16 and bring about their displacement by friction.

In order to enable the coupling of the plate 16 situated at the front of the queue in the relief track 29, each loading station Cm and unloading station Dn has a cam system comprising an articulated cam 41 arranged above the end of the hitching section 39 of the ramp 36 and adapted to pivot about a vertical axis between:

an active position in which it forms, in the longitudinal continuation of the hitching section 39, a guide for angularly supporting the coupling arms 12, which extends longitudinally above the receptacle 19 of the plate 16 situated at the front of the queue, and prevents the fingers 15 of the coupling arms 12 from getting access to this receptacle 19, and a passive position in which it is moved away laterally from the hitching section 39, and in which the finger 15 of the coupling arms 12 is guided by the said hitching section so as to enter the receptacle 19 of the plate 16 situated at the front of the queue.

As shown mainly in FIGS. 4 and 5, the cam 41 is composed of a plane hollowed-out part of generally trapezoidal shape (with bases, however, slightly convergent, as shown in the figures) which is articulated at the "upstream" vertex of the large base (as viewed in the direction of movement of the conveyor) about a vertical pin 42 and of which the small base and the side opposite the articulation pin 42 form a bent member 43 bordered longitudinally by a vertical flange 44 consisting of a strip bent in the shape of a dihedron, for bearing and guiding the fingers 15 of the coupling arms 12.

This cam 41 comprises, in addition, a transverse member 47 beneath which there is secured a vertical peg 48 arranged so as to engage in the longitudinal groove 20 of the plates 16 and thus serve as a limit stop for the plates 16 arriving level with the said cam.

The cam system comprises in addition an actuator consisting of a lever 45 articulated about a vertical axis and actuated by an electromagnet 46. This lever 45 and this electromagnet 46 are adapted and arranged so that:

in the deactivated state of the electromagnet 46 (no power supply), the lever 45, subjected to the return force of the spring of the said electromagnet, is made to pivot clockwise towards a position (shown in FIG. 4) for locking the cam 41 in its active position, in which the end of the said lever becomes blocked against the flange 44 and prevents any pivoting of the cam 41 towards its passive position;

in the activated state of the electromagnet 46 (power supply), the lever 45 is swung down by pivoting anticlockwise, thus allowing the pivoting of the cam towards its passive position under the effect of the force created on the latter by the first coupling arm 12 arriving level with the said cam. Consequently, in this activated state of the electromagnet 46, the plate 16 arranged at the front of the queue is coupled to a coupling arm 12 and is driven by the latter, this driving being allowed, in addition, by virtue of the retraction, from the longitudinal groove 20 of the said plate, of the vertical peg 48 of the cam 41 which moves away through the lateral opening 21 of the said groove upon the pivoting of the cam 41.

Each loading station Cm and unloading station Dn has, in addition, two detecting cells 49, 50, each arranged respectively opposite the central section 32 of the relief track 29, one 49, called the entry cell, substantially downstream of the unhitching point of the plates 16, and the other 50, called the exit cell, substantially upstream of the hitching point of the plate 16 situated at the front of the queue.

First of all, the entry cell 49 is arranged so that its beam is intersected by the plates 16, once the latter are unhitched, as they move along the central section 32 of the relief track 29. The information transmitted by this entry cell 49 makes it possible to check for the correct circulation of the plates 16 along the relief track 29 (cell 49 obstructed then cleared as each plate 16 passes), and if necessary inhibit the control of the routing lever 34 and stop the movement of the conveying chain 1, in the event of malfunction, thus avoiding any risk of the plates 16 accumulating in the relief path 29 upstream of the unhitching point of these plates.

The exit cell 50 is, for its part, arranged so that its beam is intersected by the plate 16 situated at the front of the queue in the relief path. The information transmitted by this exit cell 50 makes it possible to check for the presence of a plate 16 at the front of the queue and if necessary inhibit the activation of the electromagnet 46 and hence the movement of the cam 41 away towards its passive position, in the absence of the plate 16 at the front of the queue.

Each loading station Cm and unloading station Dn comprises finally a control box 51 having mainly:

two indicator lights 52, 53 of different colours, the function of which is explained further below, and a push-button 54, the actuation of which is intended in particular to enable the operator to control the activation of the electromagnet 46 and hence the movement of the cam 41 away and the hitching of the plate 16 situated at the front of the queue in the relief path by a coupling arm 12.

Lastly, the sorting and packaging unit according to the invention comprises in customary fashion, as shown in FIG. 1, a conveyor 55 for supplying the products to be sorted to the charging stations Cm, and also conveyors such as 56 for discharging the packaged products along each of the unloading lines L3, L4, L6.

The operation of the sorting and packaging unit according to the invention is described below.

First of all, although the sorting and packaging unit consists of a single main conveying line, the operation of the latter is based on independent management:

of the loading zone (section L1) and hence of the loading stations Cm, mainly using the information provided by the detection electronics 11, and of the unloading zone (section L3, L4, L6) and hence of the unloading stations Dn, mainly using the information provided by the analysing station 10.

As mentioned above, the management of the loading zone is based on the information provided by the detection electronics, the two detecting cells of which are arranged so as to discriminate between:

the coupling arms 12 not pulling a plate 16, the coupling arms 12 pulling a plate without load attached, and the coupling arms 12 pulling a plate 16 loaded with an attached product.

Using this information, the unit for managing this loading zone ensures a homogeneous distribution of the single plates 16 capable of being loaded to the loading stations Cm, on the basis of the stations which are active, that is to say the stations occupied by an operator.

According to this operation, the operator's first task is to indicate that he is taking up his post in order that the managing unit takes account of his work station, a procedure which may be initiated for example by prolonged actuation of the push-button 54 and which must of course be carried out when the operator leaves his station as well.

The tasks then falling to the operator amount to hooking the products onto the hooking members of the plates 16 in readiness on the relief path and actuating the push-button 54 intended to activate the electromagnet 46 and allow the coupling of the plate 16 situated at the front of the queue by the first coupling arm 12 arriving at the level of the latter.

During this operation, and as mentioned above, the managing unit dedicated to this loading zone manages, in addition, the information delivered by the entry cell 49 and exit cell 50 of the loading stations Cm, so as in particular to compensate for inadvertent actuations of the push-button 54 by the operators (entry cell 49) and avoid excessive accumulation of the plates 16 in an unloading path.

The management of the unloading zone is, for its part, mainly based on the information resulting from the optical and ponderal analysis of the products, which enables determination of the unloading station Dn to which this product is to be distributed and consequently control of the corresponding routing lever 34.

Furthermore, at each unloading station Dn, the first task of the operator consists in unhooking the product carried by the plate 16 situated at the front of the queue in the relief path, then actuating the push-button 54 so as to allow the departure of this unloaded plate 16.

During this general operation, in addition, the information delivered by the entry cell 49 and exit cell 50 of the unloading stations Dn is processed as described above.

Besides this general operation, the sorting and packaging unit according to the invention is furthermore designed so that each package is filled with a net weight of products approaching as close as possible upwardly the minimum net weight required in this package.

To this end, each unloading station Dn has two packaging supports (not shown), each intended to be identified with one of the indicator lights 52, 53 of the control box 51, for example by a similarity of colour with that of the said indicator light, so that each indicator light 52, 53 serves as a code for identification of the support with which the package is to be filled.

The software for managing the filling of the packages consists, for its part, using the unit-weight information of each product obtained by means of weighing sensors, in:

controlling the filling of a first package until a reference net filling weight less than the total net weight of the package is obtained. By way of example, this reference weight may be equal to the total net weight minus 2.5 times the value of the average weight of the products delivered to the unloading station Dn, once the reference weight is obtained, selecting, from among the products ready at the unloading station Dn, a combination of products, the total weight of which makes it possible to come as close as possible up to the total net weight, controlling the depositing of the products arriving at the front of the queue and not previously selected into the second, initially empty package, and the depositing of the previously selected products into the first package, signalling, once the selected products have been unhooked, the end of the filling of the first package so as to enable its discharge and replacement, and controlling the continuation of the filling of the first package.

In practice, the operator is systematically informed, by the lighting of the corresponding indicator light 52, 53, of the package into which he is to deposit the product arriving at the front of the queue in the relief path.

The signalling of the end of filling may, for its part, consist in flashing the corresponding indicator light 52, 53 so as to inform the operator that the product arranged at the front of the queue constitutes the last product to be introduced into the package corresponding to the flashing indicator light.

Finally, the absence of the lighting of the two indicator lights 52, 53 is used to indicate to the operator that he cannot unload the product, owing to the absence of the indication of its destination. This signalling is controlled in particular by the managing software at the time of the selection by the latter of a satisfactory combination of products for the end of filling, which may make it necessary to await the arrival of new products at the unloading station Dn.

According to the invention, the products are therefore hung beneath plates 16 which ensure their transportation, without transfer, from the loading zones Cm as far as the unloading zones Dn, to which these products are distributed according to the predetermined optical and ponderal selection criteria. Thus, between their hooking-on, unhooking and packaging, the products are hung naturally from the plates and are not subjected to any handling which might damage them.

Furthermore, such a sorting and packaging unit is completely automated and requires unskilled workers, their only tasks consisting on the one hand in hanging the products on the hooking member 24 of the plate 16 situated at the front of the queue in a loading station Cm, and controlling the departure of this plate 16, and on the other hand in unhooking the product hanging from the plate situated at the front of the queue in an unloading station Dn, depositing this product into one of the two packages available to the operator, according to the information provided by an indicator light 52, 53, then controlling the departure of the unloaded plate 16.

What is claimed is:

1. Unit for sorting and packaging products capable of being hung on a hooking member (24) for the purpose of their conveyance, such as bunches of fruits, in particular table grapes or truss tomatoes, characterised in that it comprises in combination:

a conveying line (2, 3) with an endless chain (1) moving in a substantially horizontal plane and beneath which there are distributed a plurality of coupling arms (12) articulated with respect to the said chain about a vertical axis, so as to be able to pivot between two positions, called the pulling and grasping positions, each of the said coupling arms being associated with resilient means (14) capable of urging its pivoting towards its grasping position, and having a free end equipped with a coupling member (15), a conveying track (17) which forms a circuit parallel to that of the conveying line (2, 3), extends in a horizontal plane situated beneath that of the said conveying line vertically in line with the coupling members (15) of the coupling arms (12) in the pulling position of the latter, and on which there are arranged a plurality of plates (16), each equipped, on the one hand, with a coupling member (19) capable of being coupled to the coupling member (15) of a coupling arm (12) for the purpose of pulling each of the said plates by one of the said coupling arms, and, on the other hand, with a hooking member (24) for hanging a product beneath the said plate, a plurality of work stations Cm, Dn, distributed laterally along the conveying line (2, 3) and each having:

a track, called the relief track (29), equipped with two end sections (31, 33) for joining to the conveying track (17) and with a central section (32) extending parallel to the conveying line (2, 3), vertically in line with the coupling members (15) of the coupling arms (12) in the grasping position of the latter, routing means (34, 35) arranged at the junction between the access section (31) of the relief track (29) and the conveying track (17), uncoupling means (36) capable of releasing the coupling members (15, 19) of the coupling arms (12) and of the plates (16), means (40) for driving the uncoupled plates (16) capable of displacing them along the central section (32) of the relief track (29) as far as a position of readiness, called the "front of the queue" position, coupling means (41, 45, 46) capable of enabling, when instructed, a coupling of the plate (16) situated at the front of the queue to a coupling arm (12) of the conveying line (2, 3), in the grasping position of this arm, an optical and/or ponderal analysing station (10) arranged along the conveying track (17) for the purpose of providing information enabling the sorting of the products according to predetermined selection criteria, a detecting station (11) arranged along the conveying track (17) and adapted to detect the passage of the empty plates (16) pulled along the said conveying track by a coupling arm (12), the said analysing station and detecting station being arranged so as to delimit two distinct zones along the path of the conveying line (2, 3), consisting, as viewed in the direction of movement of the endless chain (1), of:

a product-unloading zone (L3, L4, L6); which has, as the upstream starting limit, the analysing station (10) and along which n work stations Dn are distributed, and a product-loading zone (L1), which has, as the upstream starting limit, the detecting station (11) and along which m work stations Cm are distributed, and programmed managing means capable, in the loading zone (L1), of controlling the routing means (34, 35) of the work stations Cm so as to distribute to the said work stations the empty plates (16) detected by the detecting station (11), and, in the unloading zone (L3, L4, L6), of controlling the routing means (34, 35) of the work stations Dn so as to supply each of the said work stations with products of a given classification.

2. Sorting and packaging unit according to claim 1, characterised in that the coupling members (15, 19) of the coupling arms (12) and of the plates (16) comprise front coupling faces capable of enabling coupling by frontal abutment of the said coupling faces, which leads to pulling of the plates (16) by the coupling arms (12), and uncoupling by pivoting the said coupling arms towards their pulling position.

3. Sorting and packaging unit according to claim 2, characterised in that the coupling members of the coupling arms (12) consist of a finger (15) extending vertically beneath the said coupling arms, the coupling members of the plates (16) consisting of a receptacle (19) made in the said plates and equipped with a longitudinal opening for lateral introduction and escape of the fingers (15) of the coupling arms (12) upon the pivoting of the latter.

4. Sorting and packaging unit according to claim 2, characterised in that:

the uncoupling means comprise, for each work station Cm, Dn, means (36) for supporting and guiding the coupling members (15) of the coupling arms (12), capable of bringing about a pivoting of the said coupling arms towards an intermediate position between their grasping position and their pulling position, counter to the force exerted by the associated resilient means (14), then of allowing a reverse pivoting of the coupling arms (12) so that the latter extend in their grasping position vertically in line with the front of the queue position of the plates (16) on the relief track (29), the coupling means (41, 45, 46) comprise a retractable supporting member (41) capable of selectively deviating the coupling arms (12) from their grasping position, vertically in line with the front of the queue position of the plates (16) on the relief track (29).

5. Sorting and packaging unit according to claim 4, characterised in that the uncoupling means comprise a fixed ramp (36) for supporting and guiding the coupling members (15) of the coupling arms (12), which is arranged above the central section (32) of the relief track (29) and has an oblique initial unhitching section (37) secant with respect to the axis of the central section (32) of the relief track (29), a central section (38) parallel to the said axis, and an oblique final hitching section (39) secant with respect to the axis of the central section (32) of the relief track (29).

6. Sorting and packaging unit according to claim 4, characterised in that the retractable supporting member (41) consists of a cam (41) articulated about a vertical axis and equipped with a longitudinal border (43, 44) for supporting and guiding the coupling members (15) of the coupling arms (12), the coupling means comprising, in addition, actuating means (45, 46) capable of pivoting the said cam between an active position for supporting and guiding the coupling members (15) of the coupling arms (12), and a passive position retracted with respect to the said coupling members in their grasping position.

7. Sorting and packaging unit according to claim 6, characterised in that each work station Cm, Dn has a manually-actuated member (54) for activating the actuating means (45, 46), which is capable of bringing about the pivoting of the cam (41) towards its passive position.

8. Sorting and packaging unit according to claim 6, characterised in that the cam (41) has a stop peg (48) extending vertically beneath the said cam and adapted to lodge in a longitudinal groove (20) made in the plates (16), in the active position of the said cam, and to escape from the said longitudinal groove, through a lateral opening (21)

made in this longitudinal groove (20), upon the pivoting of this cam (41) from its active position towards its passive position.

9. Sorting and packaging unit according to claim 1, characterised in that the means for driving the plates (16) along the central section (32) of the relief tracks (29) comprise an endless chain (40) moving in a vertical plane, having a horizontal strand integrated in the relief track (29), for bearing the plates (16).

10. Sorting and packaging unit according to claim 1, characterised in that the conveying track (17) and each relief track (29) comprise a longitudinal slot (18, 30) made in the said tracks, each plate (16) having a vertical rod (23) secured beneath the said plate so as to extend through the slot (18, 30) of the tracks (17, 29), and carrying a member (24) for hooking on a product.

11. Sorting and packaging unit according to claim 1, characterised in that the detecting station (11) comprises two detecting cells which are vertically offset and arranged so as to discriminate respectively, upon the passage of a coupling arm (12), between the presence of an empty plate (16) coupled to the said coupling arm, and the presence of a plate (16) loaded with a product attached to this coupling arm (12).

12. Sorting and packaging unit according to claim 1, characterised in that each work station Cm, Dn has a cell, called the exit cell (50), for detecting the presence of a plate (16) in the front of the queue position on the relief track (29), the managing means being programmed to inhibit the operation of the coupling means (41, 45, 46) in the absence of the activation of the said detecting cell.

13. Sorting and packaging unit according to claim 1, characterised in that each work station Cm, Dn has a cell, called the entry cell (49), for detecting the passage of an uncoupled plate (16) on the central section (32) of the relief track (29), the managing means being programmed to inhibit the routing means (34, 35), so as to prevent access to the said relief track, and to stop the movement of the conveying chain (1), in the absence of sequences of activation/deactivation of the said detecting cell.

14. Sorting and packaging unit according to claim 1, characterised in that:
 each unloading station Dn has two supports capable of each receiving a package to be filled, each of the said supports having a distinctive sign capable of enabling its identification with an indicator light (52, 53) dedicated to the said support,
 the managing means are programmed, for each unloading station Dn, to bring about selective lighting of the indicator lights (52, 53) in order, using the unit-weight information of each product, to:
 control the filling of a first package until a reference net filling weight less than the total net weight of the package is obtained,
 once the reference weight is obtained, select, from among the products ready at the unloading station Dn, a combination of products, the total weight of which makes it possible to come as close as possible up to the total net weight,
 control the depositing of the products arriving at the front of the queue and not previously selected into the second, initially empty package, and the depositing of the previously selected products into the first package,
 signal, once the selected products have been unhooked, the end of the filling of the first package so as to enable its discharge and replacement,
 and control the continuation of the filling of the first package.

* * * * *